United States Patent [19]

Yamamori et al.

[11] 4,223,570
[45] Sep. 23, 1980

[54] POWER TRANSMISSION FOR AUTOMOTIVE VEHICLE

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 958,860

[22] Filed: Nov. 8, 1978

[30] Foreign Application Priority Data

Sep. 18, 1977 [JP] Japan .................................. 53-114942

[51] Int. Cl.² ............................................ F16H 37/08
[52] U.S. Cl. .................. 74/695; 308/207 A; 403/259; 403/260
[58] Field of Search .......... 308/189 A, 207 A, 207 R; 74/695; 403/21, 22, 365–372, 259, 260

[56] References Cited

U.S. PATENT DOCUMENTS

| 3,095,758 | 7/1963 | Bixby ................................. 74/695 X |
| 3,156,506 | 11/1964 | Scheifele et al. ................. 308/207 A |
| 3,793,906 | 2/1974 | Williams et al. .................... 74/695 X |
| 3,800,626 | 4/1974 | Koivunen ............................. 74/695 |

FOREIGN PATENT DOCUMENTS 1387151  3/1975  United Kingdom ................ 308/207 R

*Primary Examiner*—Kenneth Downey
*Attorney, Agent, or Firm*—Thompson, Birch, Gauthier & Samuels

[57] ABSTRACT

An output gear of a power transmission is drivably connected through an idler gear to an input gear of a final drive unit having a differential. The idler gear is mounted through a pair of tapered roller bearings on a sleeve shaft which is supported by opposite two walls between which the idler gear is located. An end portion of the sleeve shaft is adjustably received within a recess formed at the inner surface of one of the walls in a manner that a bolt securing the sleeve shaft is screwed into a boss formed in the recess of the wall.

21 Claims, 9 Drawing Figures

FIG. 1 PRIOR ART
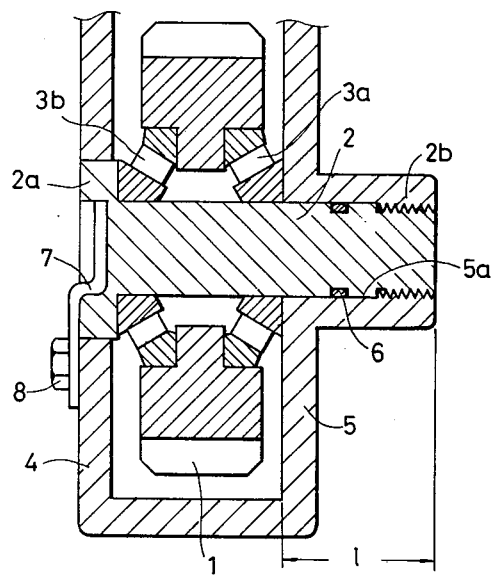
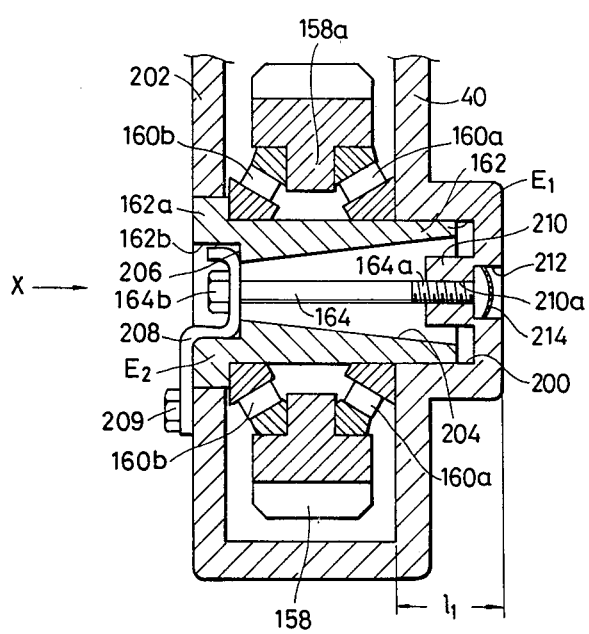
FIG. 3
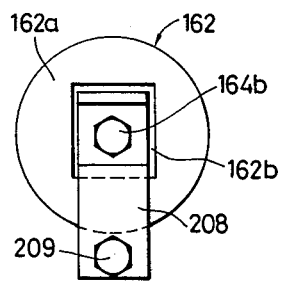
FIG. 4

POWER TRANSMISSION FOR AUTOMOTIVE VEHICLE

This invention relates, in general, to an improvement of a power transmission for an automotive vehicle, and more particularly to the improvement in an idler gear supporting arrangement of the power transmission for a transverse engine of the vehicle having a front-drive system.

It is the prime object of the present invention to provide an improved power transmission for an automotive vehicle, which is sufficiently compact and accordingly suitable for being mounted on the automotive vehicle.

It is another object of the present invention to provide an improved power transmission for a transverse engine of an automotive vehicle, whose inner construction is compact as compared with that of prior art power transmission, which leads to reduction of overall size of the transmission.

It is a further object of the present invention to provide an improved power transmission for a transverse engine of an automotive vehicle having a front-drive system, which transmission has a compact idler gear supporting arrangement which is sufficiently small in the dimension in the axial direction of the idler gear.

Other objects, features and advantages of the power transmission according to the present invention will become more apparent from the following description taken in conjunction with the accompanying drawings, in which:

FIG. 1 is a schematic cross-sectional view of an idler gear supporting arrangement of a prior art power transmission of an automotive vehicle;

FIGS. 2(A) and 2(B) represent in combination a cross-sectional view of a preferred embodiment of a power transmission according to the present invention, of an automotive vehicle;

FIG. 3 is an enlarged schematic cross-sectional view of an embodiment of an idler gear supporting arrangement of the present invention which may be used in the transmission of FIG. 2;

FIG. 4 is a side view of a portion of the arrangement of FIG. 3, as viewed from a direction of an arrow X;

Figure 2A:
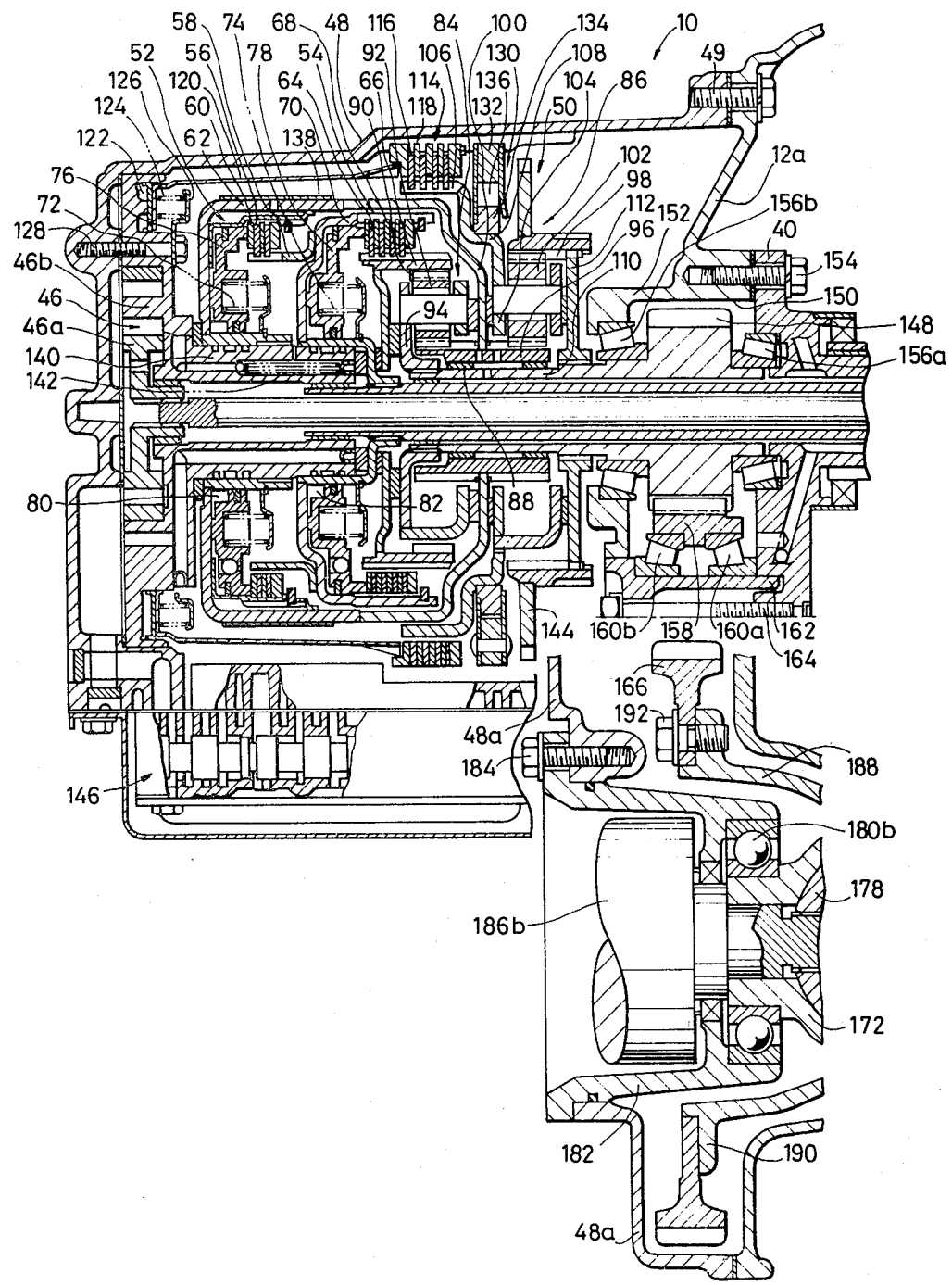

In order to obtain a compact power transmission, it is desirable to render the inner construction of the transmission as compact as possible. This is extremely important for automotive vehicles employing a front-drive system for driving the front wheels of the vehicle with a transverse engine whose longitudinal axis is transverse to the longitudinal axis of the vehicle. This is due to the fact that such a transverse engine must be mounted within a limited or smaller transverse width of an engine room located at the front portion of a vehicle body.

FIG. 1 shows an idler gear supporting arrangement of a prior art automatic transmission for an automotive vehicle, in which the reference numeral 1 denotes an idler gear which is interposed between an output gear (not shown) of the automatic transmission and an input gear (not shown) of a final drive unit in order to transmit a driving power from the transmission to the final drive unit. The idler gear 1 is rotatably mounted on an idler shaft 2 through a pair of tapered roller bearings 3a and 3b. The idler shaft 2 is formed at one end thereof with a radial annular portion 2a and at the others end thereof with a thread portion 2b. The radial annular portion 2a is received in an opening formed through a wall 4 integral with a converter housing (not shown) in which a torque converter is disposed. The thread portion 2b is screwed into a bore 5a formed at a wall 5 secured to the converter housing. The idler shaft 2 is formed at its cylindrical peripheral surface with a groove (no numeral) which receives an O-ring 6 for sealing. Indicated by the reference numeral 7 is a plate member for preventing the idler shaft 2 from rotating about its axis, which member 7 is secured to the wall 4 by a bolt 8. With this arrangement, a preload is applied to the bearings 3a and 3b as the idler shaft 2 is screwed into the bore 5a.

Such prior art arrangements have encountered the following problems: since the bearing supporting portions, the sealing portion having the O-ring 6, and the thread portion 2b are all aligned on the same cylindrical peripheral surface of the idler shaft 2, the dimension indicated by l unavoidably becomes larger. This results in a longer inner construction of the transmission and therefore in a large-size power transmission.

In view of the above, the present invention solves the problem encountered in the prior art transmission by shortening the dimension corresponding to that indicated by l in FIG. 1.

Figure 2B:
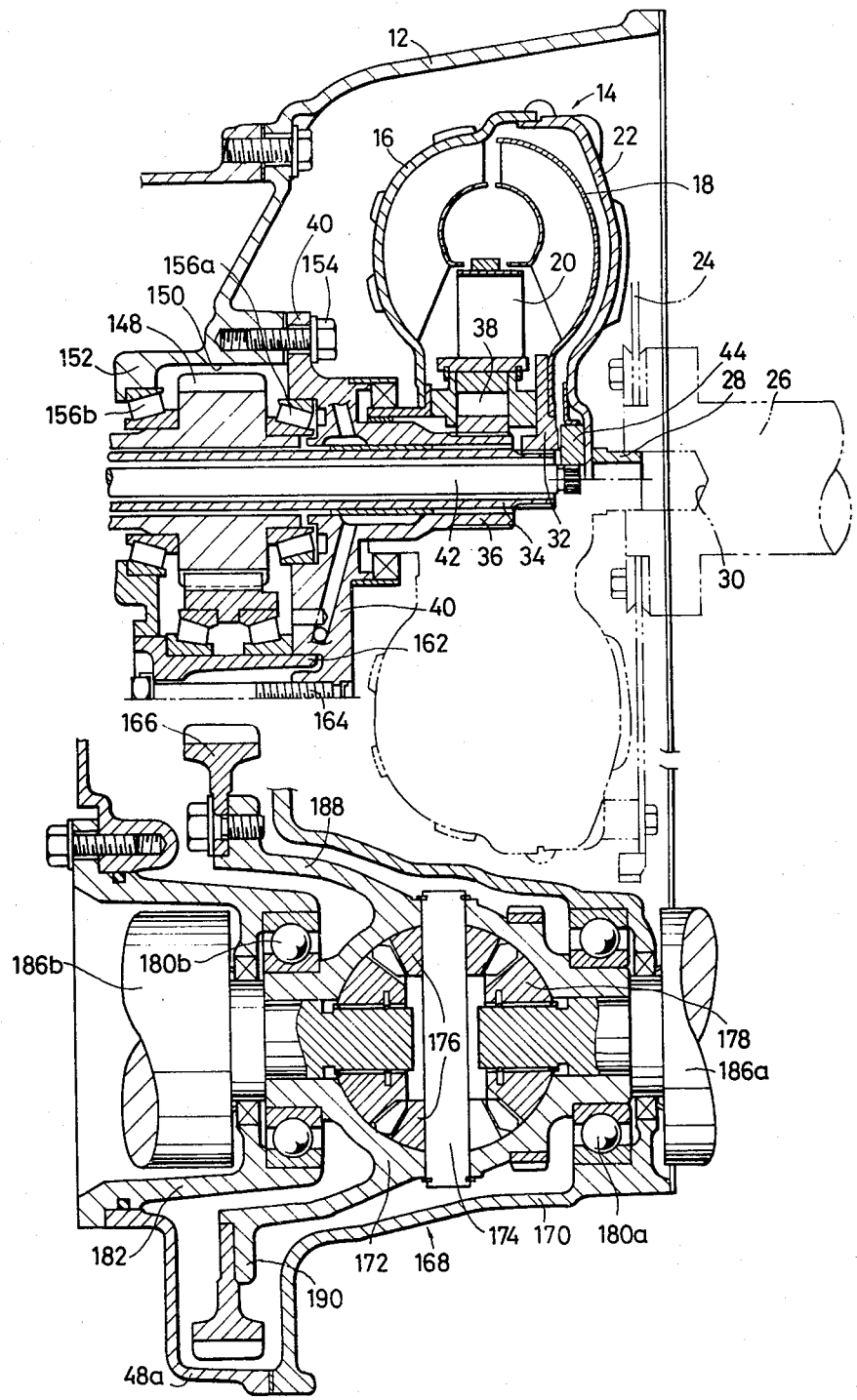

Referring now to FIGS. 2(A) and 2(B) of the drawings, there is illustrated a preferred embodiment of a power transmission in accordance with the present invention.

The transmission 10 comprises a converter housing 12 within which the torque converter assembly 14 is housed. The torque converter assembly 14 comprises a pump impeller 16, a turbine runner 18, and a stator 20 as is well known in the art. The pump impeller 16 is connected via a converter cover 22 and a drive plate 24 to a crankshaft 26 of a power plant such as an internal combustion engine (not shown) and is rotatable with crankshaft 26 about an axis which is aligned with the axis of rotation of the crankshaft 106. Denoted by 28 is a pilot element which is secured to a central portion of the converter cover 22 and is received in a central bore 30 of the crankshaft 26, as shown. The turbine runner 18 is mounted on a hub 32 which in turn is keyed or splined to a transmission hollow input shaft 34 which has a center axis aligned with the axis of rotation of the engine crankshaft 26. The stator 20 is positioned between the pump impeller 16 and the turbine runner 18 and is mounted on a stator support hollow shaft 36 through a torque converter one-way clutch assembly 38. The stator support hollow shaft 36 has the transmission hollow input shaft 34 axially passed therethrough in substantially coaxial relationship and is fixedly but detachably connected through a flange portion 40 thereof to a base wall 12a of the converter housing 12, as will be well understood hereinlater. The stator 20 is permitted to rotate about the center axis of the input shaft 34 in the same direction as the direction of the pump impeller 16 and accordingly as the direction of rotation of the engine crankshaft 26. An oil pump driving shaft 42 is rotatably and concentrically received in the input shaft 34 and has a right end to which a hub 44 of the converter cover 22 is splined or keyed. As will be understood hereinlater, a left end of the oil pump driving shaft 42 is keyed with a drive gear 46a of a transmission oil pump assembly 46 which has an oil pump body 46b bolted or otherwise secured to a stationary wall structure of a later-mentioned gear unit housing 48 of the transmission 10.

When the engine is in operation, the driving power produced by the engine is delivered from the engine crankshaft 26 to the pump impeller 16 through the converter cover 22 and is transmitted from the pump impeller 16 to the input shaft 34 through the turbine runner 18 with a torque multiplied by means of the stator 20 at a ratio which is variable with the ratio between the revolution speed of the engine crankshaft 26 and that of the input shaft 34. The pump impeller 16 thus drives not only the turbine runner 18 but also the transmission oil pump assembly 46 through the oil pump driving shaft 42 so that the oil pump assembly 46 delivers oil under pressure which is also variable with the revolution speed of the crankshaft 26 of the engine.

Within the gear unit casing 48 connected via bolts 49 to the converter housing 12 is positioned a gear unit 50 of the transmission 10. The unit 50 herein shown is arranged between the torque converter assembly 14 and the oil pump assembly 46. The gear unit 50 comprises first and second or high-and-reverse and forward drive clutches 52 and 54 which are positioned in a manner that the high-and-reverse clutch 52 is located between the oil pump assembly 46 and the forward drive clutch 54. The high-and-reverse clutch 52 comprises a plurality of plates 56 keyed or splined at their inner peripheral edges to a clutch hub 58 and plates 60 keyed or splined at their outer peripheral edges to a first clutch drum assembly 62. Likewise, the forward drive clutch 54 comprises a plurality of plates 64 keyed or splined at their inner peripheral edges to a clutch hub 66 and plates 68 keyed or splined at their outer peripheral edges to a second clutch drum 70. The clutch hub 58 for the high-and-reverse clutch 52 and the second clutch drum 70 for the forward drive clutch 54 are secured to each other and rotatable with the input shaft 34 with the second clutch drum 70 keyed or splined at its inner peripheral portion to a left end portion of the input shaft 34. The plate 56 of the high-and-reverse clutch 52 and the plates 68 of the forward drive clutch 54 thus serve as driving friction elements and, accordingly, the plates 60 of the high-and-reverse clutch 52 and the plates 64 of the forward drive clutch 54 serve as driven friction elements in the clutches 52 and 54, respectively. Clutch pistons 76 and 78 are respectively incorporated with the high-and-reverse clutch 52 and the forward drive clutch 54 respectively for bringing the clutches 52 and 54 into engagement when moved by a fluid fed into respective fluid chambers 80 and 82 which are formed between the clutch piston 76 and the first clutch drum assembly 62 and between the clutch piston 78 and the second clutch drum 70, respectively, as shown. Return springs 72 and 74 are respectively incorporated with the high-and-reverse clutch 52 and the forward drive clutch 54 to urge the pistons 76 and 78 in a direction to disengage the clutches 52 and 54, respectively.

The gear unit 50 further comprises first and second planetary gear assemblies 84 and 86 which are arranged at the right of the forward drive clutch 54 in the drawing. The first planetary gear assembly 84 comprises an externally toothed sun gear 88 and an internally toothed ring gear 90 which have a common axis of rotation aligned with the center axis of the input shaft 34. The ring gear 90 is formed on the clutch hub 66 for the forward drive clutch 54. The first planetary gear assembly 84 further comprises at least two planet pinions 92 each of which is in mesh with the sun and ring gears 88 and 90 and is rotatable about an axis around the common axis of rotation of the sun and ring gears 88 and 90. The planet pinions 92 of the first planetary gear assembly 84 are journaled on shafts of a pinion carrier 94. The second planetary gear assembly 86 is constructed similarly to the first planetary gear assembly 84 and thus comprises an externally toothed sun gear 96 and an internally toothed ring gear 98 which have a common axis of rotation aligned with the center axis of the transmission hollow input shaft 34. The sun gear 96 is integral with the sun gear 88 of the first planetary gear assembly 84. The united sun gears 88 and 96 of the first and second planetary gear assemblies 84 and 86, respectively, are jointly splined to a connecting shell 100 which encloses the forward drive clutch 54 and the first planetary gear assembly 84 and is securely connected to the first clutch drum assembly 62 for the high-and-reverse clutch 52. The second planetary gear assembly 86 further comprises at least two planet pinions 102 each of which is in mesh with the sun and ring gears 96 and 98 and is rotatable about an axis around the common axis of rotation of the sun and ring gears 96 and 98. The planet pinions 102 of the second planetary gear assembly 86 are rotatably supported by a pinion carrier 104 having a drum portion 106 which leftwardly extends to enclose in part the connecting shell 100 therein, as shown. By the reason which will become clear from the latter, the drum portion 106 of the pinion carrier 104 has a circular step portion 108. The respective sun gears 88 and 96 of the first and second planetary gear assemblies 84 and 86 are formed with center bores through which a transmission hollow output shaft 110 having a center axis aligned with the center axis of the input shaft 34 is passed and axially extends toward the torque converter assembly 14. The output shaft 110 thus coaxially receives therein the input shaft 34, as shown. The output shaft 110 has a left end to which the pinion carrier 94 for the first planetary gear assembly 84 is splined at its inner peripheral edge and has an intermediate portion to which the ring gear 98 for the second planetary gear assembly 86 is connected through a generally disc shaped connecting member 112 which is keyed or splined at its inner peripheral edge to the intermediate portion of the output shaft 110 and at its outer peripheral edge to the ring gear 98. Concentrically mounted around the drum portion 106 of the pinion carrier 104 for the second planetary gear assembly 86 is a low-and-reverse brake 114. This brake 114 comprises a plurality of plates 116 keyed or splined at their inner peripheral edges to the drum portion 106 of the second planetary gear assembly 86, and a plurality of plates 118 which are keyed or splined at their outer peripheral edges to an intermediate portion of the inner wall of the gear unit housing 48. The low-and-reverse brake 114 further has a drum shaped piston 120 which is concentrically mounted around the first clutch drum assembly 62 for the high-and-reverse clutch 52 and engages at its right end to the leftmost member of the plates 116 and 118. The left end portion of the piston 120 is sealingly disposed in a fluid chamber 122 into which a fluid under pressure is fed to move the piston 120 rightwardly urging the plates 116 and 118 of the brake unit 114 to be engaged with one another against a biasing force developed by return springs 124 which are interposed between the left end portion of the piston 120 and a spring retainer 126 fixed to the oil pump body 46b via bolts 128. As shown, the fluid chamber 122 is formed in the oil pump body 46b. The low-and-reverse brake 114 is paralleled in effect by a transmission one-way clutch 130 which is positioned around the before-mentioned drum portion 106 for the second planetary gear assembly 86 and comprises a stationary outer race member 132, a rotatable inner race member 134 and a series of spring loaded rollers 136 disposed between the outer and inner race members 132 and 134. The stationary outer race member 132 is splined to the inner wall of the gear unit housing 48. On the other hand, the rotatable inner race member 134 is securely disposed on the before-mentioned circular step portion 108 of the drum portion 106 for the second planetary gear assembly 86. The rollers 136 are arranged in a manner to be caused to stick to the outer and inner race members 132 and 134 and thereby lock up the rotatable inner race member 134 to the stationary outer race member 132 when the inner race member 134 is urged to turn about the center axis of the output shaft 110 in a direction opposite to the direction of rotation of the engine crankshaft 26, viz., to the direction of rotation of the output shaft 110 to produce a forward drive mode of an automotive vehicle. The gear unit 50 of the transmission 10 further comprises a brake band 138 which wrappes the cylindrical outer surface of the first clutch drum assembly 62 for the high-and-reverse clutch 52. Although not shown, the brake band 138 is anchored at one end to the gear unit housing 48 and is at the other end connected to or engaged by a fluid operated hand servo unit (not shown). Although, not shown in the drawing, a transmission governor assembly indirectly driven by the output shaft 110 is arranged in the gear unit housing 48 in the vicinity of the ring gear 98 of the second planetary gear assembly 86. The body 46b of the before-mentioned oil pump assembly 46 has a rightwardly extending sleeve portion 140 in which a fluid passage 142 for lubrication fluid for the clutch assemblies 52 and 54 is formed. Indicated by numeral 144 is a parking gear which is secured on the ring gear 98 for the second planetary gear assembly 86, forming part of a parking lock assembly to lock the output shaft 110 by the aid of a parking pawl (not shown) meshing with the parking gear 144 during parking of the vehicle. Indicated generally by numeral 146 is a hydraulic control valve unit by which the gear unit 50 is controlled.

The output shaft 110 is integrally formed at its right section with an output gear 148 which has an axis of rotation aligned with the center axis of the output shaft 110. As will be understood from the drawing, the output gear 148 is situated within a chamber 150 which is defined by not only an extension 152 of the base wall 12a of the cover housing 12 but also the flange portion 40 of the stator support hollow shaft 36. The flange portion 40 is detachably connected to the base wall 12a by means of bolts 154. As shown, the extension 152 protrudes into the interior of the gear unit housing 48 and has at its leading end portion a bearing opening (no numeral) within which is situated a tapered roller bearing 156b. The flange portion 40 of the stator support hollow shaft 36 is formed at a portion exposed to the chamber 150 of the output gear 148 with a blind bore or bearing opening (no numeral) within which is situated another tapered roller bearing 156a. Inner races of these bearings 156a and 156b are mounted on the transmission output shaft 110 in a manner to put the output gear 148 therebetween. Meshing with the output gear 148 is an idler gear 158 which is supported by a pair of tapered roller bearings 160a and 160b. Inner races of these bearings 160a and 160b are coaxially mounted on a sleeve shaft 162 which is connected to the flange portion 40 of the before-mentioned stator support hollow shaft 36 by means of a bolt 164 passing through the sleeve shaft 162 in a manner that the axis of the idler gear 158 is parallel with the axis of the output gear 148. The idler gear 158 is meshed with an externally toothed ring gear 166 forming part of the final drive unit 168.

The final drive unit 168 is positioned on a lateral side of the transmission 10 and comprises a housing 170 integral with the converter housing 12 and housing therein a differential case 172, a differential pinion shaft 174 passing through the case 172, differential pinions 176 rotatably disposed about the pinion shaft 174, and differential side gears 178 each meshing with both the differential pinions 176 as is known in the art. The case 172 has both lateral end portions on which differential side bearings 180a and 180b are mounted. The right hand bearing 180a is securely received in the bore of the housing 170, while the lefthand bearing 180b is received in a drum-shaped retainer 182 which is detachably held in an opening (no numeral) formed in a laterally projected portion 48a of the gear unit housing 48. Denoted by numeral 184 is a bolt for connecting the retainer 182 to the portion 48a of the gear unit housing 48. Extending away from the differential side gears 178 are respective axle shafts 186a and 186b. The case 172 is integrally formed with a connecting shell portion 188 which extends leftwardly in this drawing and spacedly encloses in part the drum-shaped retainer 182. The connecting shell portion 188 has at the leading end thereof a flange 190 to which the above-mentioned externally toothed ring gear 166 is fixed by means of bolts 192.

With this, the power train between the internal combustion engine and the driving road wheels connected to the axle shaft 186a and 186b is made up.

The transmission 10 incorporating with the final drive unit 168 operates as follows:

TABLE 1

| Range | | Clutches | | | | Brake band (138) | |
|---|---|---|---|---|---|---|---|
| | | High-and-Reverse (52) | Forward drive (54) | Low & reverse brake (114) | One way clutch (130) | Applied | Released |
| | "P" | | | o | | | |
| | "R" | o | | o | | | o |
| | "N" | | | | | | |
| Drive | "D₁" | | o | | o | | |
| | "D₂" | | o | | | o | |
| | "D₃" | o | o | | | (o) | o |
| | "2" | | o | | | o | |
| "1" | 2 | | o | | | o | |
| | 1 | | o | o | | | |

The high-and-reverse and forward drive clutches 52 and 54, low-and-reverse brake 114, one-way clutch 130 and brake band 138 of the transmission mechanism or the gear unit 50 having the construction hereinbefore described are operated in accordance with shedules indicated in Table 1.

In Table 1, the sign "O" indicates that for each of the high-and-reverse, forward-drive and one-way clutches 52, 54 and 130 the clutch in question is in a coupled condition and for the low-and-reverse brake 114 the brake is in a condition applied. As to the brake band 138, the sign "O" in the column under "Applied" indicates that the brake band 138 is actuated to lock up the first clutch drum assembly 62 and the sign "O" in the column under "Released" indicates that the brake band 138 is released from the first clutch drum assembly 62. The sign "O" enclosed in the parentheses means that there is a fluid pressure developed in the brake-apply chamber of the servo unit (not shown) but the brake band 138 is released from the first clutch drum assembly 62 with a fluid pressure also developed in the brake-release chamber of the servo unit.

The parking, reverse drive and neutral gear ranges and the automatic forward drive and manual second and first forward drive ranges as indicated in the leftmost column of Table are selectively established in transmission mechanism by manipulating a manual selector lever (not shown) which has positioned "P", "R", "N", "D", "2" and "1" respectively corresponding to the above-mentioned gear ranges.

When now the selector lever is in the parking range "P" or the neutral range "N", both of the high-and-reverse and forward drive clutches 52 and 54 are held in the uncoupled condition thereof so that the driving connection between the input and output shafts 34 and 110 is interrupted and as a consequence the output shaft 110 is maintained at rest even though the engine is in operation delivering its power output from the crankshaft 26. Under these conditions, either the parking range or the neutral range is established in the transmission mechanism depending upon whether the selector lever is held in the parking range "P" or in the neutral range "N". If the selector lever is in the parking range "P", the low-and-reverse brake 114 is held in the condition applied so that the drum portion 106 and accordingly the pinion carrier 104 of the second planetary gear assembly 86 are locked to the gear unit housing 48. During parking of the vehicle, the parking gear 144 mounted on the ring gear 98 for the second planetary gear assembly 86 is captured by the parking pawl (not shown) of the before-mentioned parking lock assembly so that the output shaft 110 is locked up to the gear unit housing 48.

When the manual selector lever is moved into the automatic forward drive range "D" with the engine operating, the forward drive clutch 54 is caused to couple. The power output delivered from the crankshaft 26 of the engine to the input shaft 34 through the torque converter assembly 14 is transmitted through the forward drive clutch 54 and the clutch hub 66 to the ring gear 90 of the first planetary gear assembly 84. The ring gear 90 is driven to rotate in the forward direction about the center axis of the output shaft 110 and thereby causes the sun gear 88 to rotate in the opposite direction about the center axis of the output shaft 110 through the planet pinions 92 each of which is rotated in the same direction as the ring gear 90 about its own axis of rotation. The sun gear 96 of the second planetary gear assembly 86, which is integral with the sun gear 88 of the first planetary gear assembly 84, is rotated in the opposite or reverse direction about the center axis of the output shaft 110 and causes the ring gear 98 of the second planetary gear assembly 86 to turn in the forward direction about the center axis of the output shaft 110. Under these conditions, the individual planet pinions 102 of the second planetary gear assembly 86 are caused to rotate in the forward direction about the respective axes of rotation thereof and therefore attempt to turn in the reverse direction about the center axis of the output shaft 110. The revolution of the pinion carrier 104 of the second planetary gear assembly 86 is, however, prohibited by the one-way clutch 130 connected to the pinion carrier 104, more specifically to the step portion 108 of the drum portion 106 with the result that the pinion carrier 104 is locked to the gear unit housing 48 and acts as reaction elements for the ring gear 98 which drives via the disc-shaped connecting member 112 the output shaft 110 to rotate in the forward direction about the center axis thereof. The output shaft 110 is connected to the pinion carrier 94 of the first planetary gear assembly 84 so that each of the planet pinions 92 is rotated about the center axis of the output shaft 110 in the same direction as the direction of rotation of the ring gear 90 of the first planetary gear assembly 84 but at a revolution speed which is lower with a certain ratio than the revolution speed of the ring gear 90 on which the planet pinions 92 are rolling, thereby creating the first forward speed or "low" gear ratio ($D_1$) in the transmission mechanism.

If the vehicle is thereafter sped up and the vehicle speed reaches a certain level, the band servo unit for the brake band 138 is actuated by a fluid distributed into the brake-apply fluid chamber of the servo unit and causes the brake band 138 to be tightened on the first clutch drum assembly 62 which is connected via the connecting shell 100 to the integral first and second sun gears 88 and 96 for the first and second planetary gear assemblies 84 and 86. The sun gear 88 of the first planetary gear assembly 84 now acts as a reaction element for the planet pinions 92 which are being driven to turn in the forward direction about the center axis of the output shaft 110 by the ring gear 90 rotating with the input shaft 34 through the forward drive clutch 54 which is kept coupled. The driving torque carried over to the ring gear 90 of the first planetary gear assembly 84 through the forward drive clutch 54 is therefore transmitted to the output shaft 110 by means of the planet pinions 92 and the associated pinion carrier 94. Under these conditions, the individual planet pinions 92 of the first planetary gear assembly 84 are caused to rotate in the forward direction about the respective axis of rotation thereof and thus roll on the ring gear 90 while rotating in the forward direction about the center axis of the output shaft 110. The output shaft 110 is thus rotated in the forward direction about the center axis thereof at a speed higher than that achieved under the first forward speed or "low" gear ratio ($D_1$) but lower with a certain ratio than the revolution speed of the ring gear 90 of the first planetary gear assembly 84, thereby producing the second forward speed or intermediate ratio ($D_2$) in the transmission mechanism. Under the second forward speed thus established, the output shaft 110 drives the ring gear 98 of the second planetary gear assembly 86 to rotate in the forward direction about the center axis of the output shaft 110 and thereby causes the planet pinions 102 to turn about the center axis of the output shaft 110 in the same direction as the direction of rotation of the ring gear 98. Thus, the pinion carrier 104 of the second planetary gear assembly 86 and accordingly the drum portion 106 are also rotated in the forward direction about the center axis of the output shaft 110 and cause the inner race member 134 of the transmission one-way clutch 103 to run idle within the outer race member 132 of the one-way clutch 130.

As the vehicle speed further increases, a fluid is distributed into the brake-release fluid chamber of the band servo unit for the brake band 138 and causes the brake band 138 to be released from the first clutch drum assembly 62 and, substantially at the same time, the high-and-reverse clutch 52 is actuated to couple. The power output delivered from the crankshaft 26 of the engine to the input shaft 34 is now transmitted on one hand to the integral first and second sun gears 88 and 96 of the first and second planetary gear assemblies 84 and 86 through the high-and-reverse clutch 52 and the first clutch drum assembly 62 released from the brake band 138 and on the other hand to the ring gear 90 of the first planetary gear assembly 84 by way of the forward drive clutch 54 and the clutch hub 66. It therefore follows that the sun gear 88 and the ring gear 90 for the first planetary gear assembly 84 are locked up so that the sun and ring gears 88 and 90 and the planet pinions 92 therebetween as well as the output shaft 110 connected to the planet pinion 92 by the pinion carrier 94 are driven to rotate as a single unit in the forward direction about the center axis of the output shaft 110. The output shaft 110 is thus rotated in the forward direction about the center axis thereof at a speed substantially equal to the revolution speed of the input shaft 34, thereby providing the third forward speed or "high" gear ratio ($D_3$) in the transmission mechanism. Under the third forward drive speed thus established, the input shaft 34 driven by the turbine runner 18 of the torque converter 14 is rotated at a speed substantially equal to the revolution speed of the engine crankshaft 26 driving the pump impeller 16 of the converter 14 and, as a consequence, there occurs no torque multiplication by the torque converter 14, which thus functions merely as a fluid coupling.

When the manual selector lever is moved into the reverse drive range "R". The high-and-reverse clutch 52 and the low-and-reverse brake 114 are actuated in the transmission mechanism. With the high-and-reverse clutch 52 thus engaged, the power output delivered from the crankshaft 26 of the engine to the input shaft 34 by way of the torque converter 14 is transmitted through the high-and-reverse clutch 52, first clutch drum assembly 62 and connecting shell 100 to the integral sun gears 88 and 96 of the first and second planetary gear assemblies 84 and 86, respectively, causing the sun gears 88 and 96 to rotate in the forward direction about the center axis of the output shaft 110. The low-and-reverse brake 114 is being actuated to lock the drum portion 106 and thus the pinion carrier 104 for the second planetary gear assembly 86 is held stationary with respect to the gear unit housing 48, with the result that the planet pinions 102 of the second planetary gear assembly 86 are driven by the sun gear 96 for rotation in the reverse direction about the center axis of the output shaft 110. This causes the output shaft 110 to rotate in the reverse direction about the center axis thereof at a speed which is lower with a certain ratio than the revolution speed of the sun gears 88 and 96 of the first and second planetary gear assemblies 84 and 86 and accordingly of the input shaft 34, establishing the reverse drive range "R" in the transmission mechanism.

When the selector lever is in the manual second forward drive range "2", the forward drive clutch 54 and the brake band 138 are actuated and, as a consequence the output shaft 110 is driven to rotate in the forward direction about the center axis thereof by means of the pinion carrier 94 of the first planetary gear assembly 84 as in the second forward speed ($D_2$) produced with the selector lever held in the automatic forward drive range "D".

Under the condition in which the selector lever is held in the manual first forward drive range position "1", either the low-and-reverse brake 114 or the brake band 138 as well as the forward drive clutch 54 is actuated to lock the pinion carrier 104 of the second planetary gear assembly 86 or the integral sun gears 88 and 96 of the first and second planetary gear assemblies 84 and 86 depending upon the vehicle speed. If the forward drive clutch 54 and the brake band 138 are actuated in this instance, the output shaft 110 is driven to rotate in the forward direction by the pinion carrier 94 of the first planetary gear assembly 84 as in the second forward speed ($D_2$) established with the selector lever held in the automatic forward drive range "D". If, on the other hand, the forward drive clutch 54 and the low-and-reverse brake 114 are actuated in the manual forward speed range, the output shaft 110 is driven to rotate in the forward direction about the center axis thereof by the ring gear 98 of the second planetary gear assembly 86 having the pinion carrier 104 held stationary with respect to the gear unit housing 48, as in the first forward speed ($D_1$) produced with the selector lever held in the automatic forward drive range "D". While the pinion carrier 104 is locked to the gear unit housing 48 by the action of the transmission one-way clutch 130 under the first forward speed produced in the automatic forward drive range, the pinion carrier 104 is locked to the gear unit housing 48 by means of the low-and-reverse brake 114 under the first forward speed produced in the manual first forward drive range. During the first forward speed in the manual first forward drive range, therefore a driving torque can be transmitted backwardly from the ring gear 98 to the sun gear 96 through the planet pinions 102 in the second planetary gear assembly 86 and, for this reason, the engine brake can be obtained.

FIGS. 3 and 4 illustrate one embodiment of an arrangement in accordance with the present invention for supporting idler gear 158, employed in the transmission shown in FIG. 2. As shown, one end portion $E_1$ of the sleeve shaft 162 is disposed in a cylindrical recess 200 formed at the inner surface of the flange portion 40 or wall so that the cylindrical surface of the sleeve shaft 162 tightly contacts the cylindrical surface of the recess 200. The other end portion $E_2$ of the sleeve shaft 162 is formed with a radial annular portion 162a which is received in a circular opening (no numeral) formed through a wall 202 integral with the converter housing 12.

The inner races of the bearings 160a and 160b are, as viewed, spaced apart from each other and located between the wall 40 and the radial annular portion 162a in a manner that the inner races of bearings 160a and 160b are contacted by and held between the wall 40 and radial annular portion 162a, respectively. Outer races of the bearings 160a and 160b support the idler gear 158 with a radial annular portion 158a thereof interposed therebetween.

As seen, the sleeve shaft 162 defines a frusto-conical bore 204 whose diameter increases from right to left as viewed in FIG. 3 toward the end portion $E_1$. An end of the frusto-conical bore is merged into a somewhat rectangular recess 162b which is formed at the end portion E₂ of the shaft 162. At least a dimension of the recess 162b perpendicular to the axis of the sleeve shaft 162 is larger than the diameter of the frusto-conical bore 204 at the bottom of the recess 162b so that a shelf portion 206 is formed at the bottom of the recess 162b. A plate member 208 is disposed in the recess 162b and placed on the shelf portion 206. The plate member 208 is secured at its one end portion to the wall 202 by means of a bolt 209. It is to be noted that the recess 162b and the plate member 208 are so shaped that the plate member 208 prevents the sleeve shaft 162 from freely rotating. The plate member 208 is formed with an opening (not shown) through which the bolt 164 passes. The bolt 164 is formed at one end thereof with a thread portion 164a and at the other end thereof with a head 164b. The thread portion 164a is screwed into a threaded opening 210a of a central cylindrical projection or boss 210 which is formed at the central portion of the cylindrical recess 200 and integral with the wall 40. The threaded opening 210a has a common axis aligned with the axis of the recess 200. As shown, the projection 210 defines therearound an annular space (no numeral) in which the end E₁ of the sleeve shaft 162 lies. It is preferable that the diameter of the bore 204 of the sleeve shaft 162 adjacent the end E₁ is slightly larger than the outer diameter of the cylindrical projection 210 in order that an end portion of the shaft 162 adjacent the end E₁ is disposed around the cylindrical projection 210. The bolt head 164b is located opposite to thread portion 164a relative to the plate member 208. Accordingly, when the bolt 164 is screwed in by rotating the bolt head 164b, the plate member 208 urges the sleeve shaft 162 axially in the direction of the wall 40. As a result, a desired preload can be applied to the bearings 160a and 160b. The wall 40 is formed at its outer surface with a cylindrical recess 212 which communicates with the threaded opening 210a of the projection 210. A circular cap or plug 214 is securely disposed in the recess 212 in a manner that the outer periphery of the cap 214 sealingly contacts the cylindrical surface of the recess 212. Accordingly, fluid or oil present inside the wall 40 is prevented from leaking out of the wall 40 through the threaded opening 210a.

It will be appreciated from the foregoing, that the dimension indicated by l₁ becomes considerably smaller than that l in the prior art shown in FIG. 1.

Figure 5:
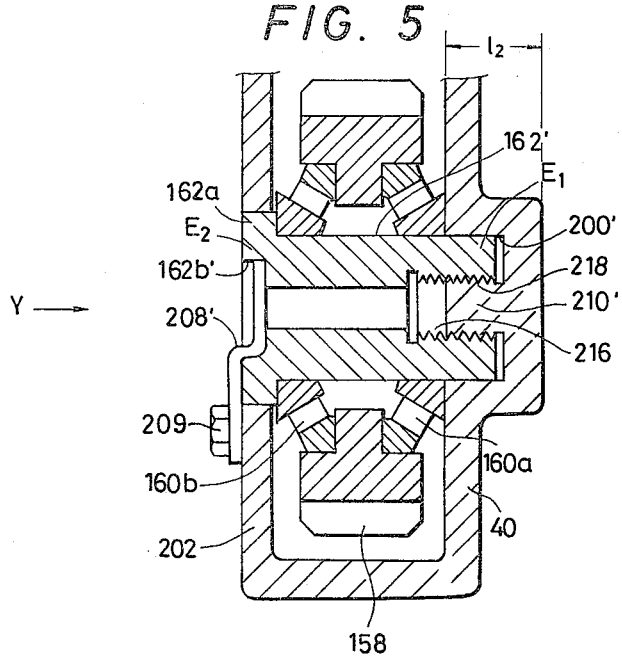
FIG. 5 is an enlarged schematic cross-sectional view similar to FIG. 3, but showing another embodiment of the idler gear supporting arrangement of the present invention which may be used in the transmission of FIG. 2.
Figure 6:
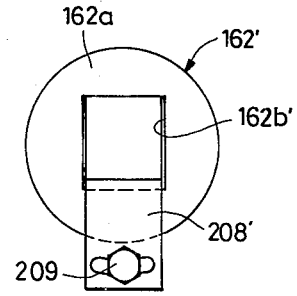
FIG. 6 is a side view of a portion of the arrangement of FIG. 5, as viewed from a direction of an arrow Y.

FIGS. 5 and 6 show another embodiment of the idler gear supporting arrangement of the transmission in accordance with the present invention, which is essentially similar to that shown in FIGS. 3 and 4, and accordingly the same reference numerals are assigned to the corresponding parts and elements.

The sleeve shaft 162' is formed with a threaded cylindrical bore 216 which extends from one end portion E₁ of the sleeve shaft 162' toward the other end portion E₂ of the same. The cylindrical bore 216 has a common axis aligned with the axis of the sleeve shaft 162'. As shown, the wall 40 is formed at its inner surface with the cylindrical recess 200'. The cylindrical projection or boss 210' is formed at the central portion of the cylindrical recess 200' and integral with the inner surface of the wall 40. The end portion E₂ of the shaft 162' is inserted in an annular space (no numeral) defined between the cylindrical surfaces of the cylindrical recess 200' and the boss 210'. Additionally, the thread portion 216 of the sleeve shaft 162' is engaged with a thread portion 218 of the boss 210'. The sleeve shaft 162' is formed with a somewhat rectangular recess 162b' at the end portion E₂ so that a portion of the plate member 208' is disposed in the recess 162b'. It is to be noted that the plate member 208' prevents the sleeve shaft 162' from freely and unnecessarily rotating. The recess 162b', in this instance, communicates through a cylindrical opening (no numeral) with the bore 216. With this arrangement, when the sleeve shaft 162' is rotated in the direction to be screwed in, the location of the radial annular portion 162a of the sleeve shaft 162' is moved toward the wall 40 and therefore a desired preload can be applied to the both the bearings 160a and 160b.

It will be understood from the foregoing, that the dimension indicated by l₂ becomes considerably smaller than that l of the prior art transmission as shown in FIG. 1.

Figure 7:
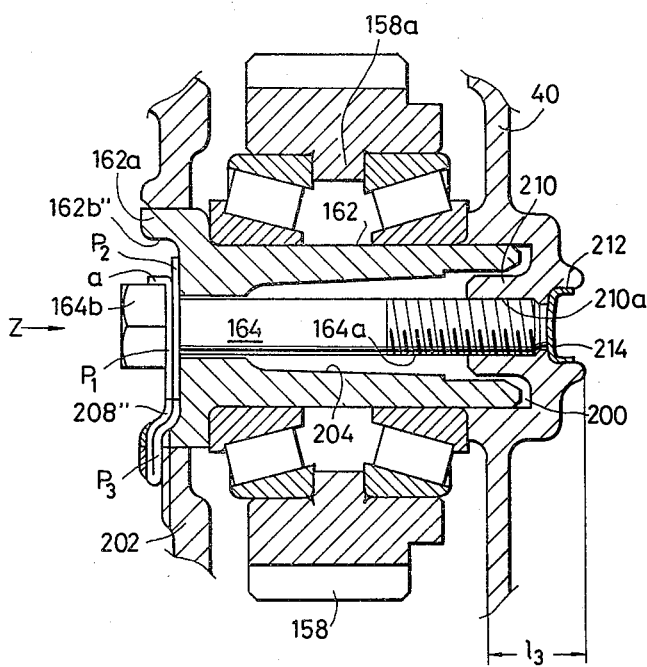
FIG. 7 is an enlarged schematic cross-sectional view similar to FIG. 3, but showing still another embodiment of the idler gear supporting arrangement of the present invention in which may used in the transmission of FIG. 2.
Figure 8:
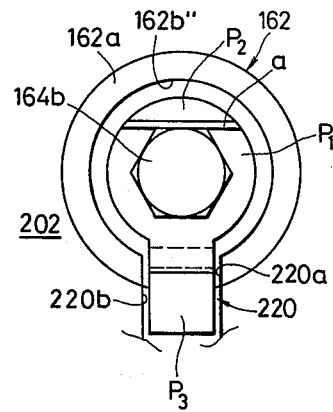
FIG. 8 is a side view of a portion of the arrangement of FIG. 7, as viewed from a direction of an arrow Z.

FIGS. 7 and 8 show a further embodiment of the idler gear supporting arrangement of the transmission in accordance with the present invention, which is essentially the same as the example of FIGS. 3 and 4 except for the construction of the plate member 208" for preventing the sleeve shaft 162 from freely rotating. Accordingly, like reference numerals are assigned to like parts for the purpose of simplicity of description.

The plate member 208" includes two superimposed disc portions P₁ and P₂, and an elongate plate portion P₃ which connects the two disc portions, before assembly. In order to put this plate member 208" within the groove 162b" in a state as shown in FIGS. 7 and 8, the plate member 208" is bent at the middle portion of the elongate plate portion P₃ so as to place the disc portion P₁ upon the disc portion P₂. The bolt 164 passes through openings (not shown) formed at the central portions of the disc portions P₁ and P₂ so that the bolt head 164b contacts the disc portion P₁. As shown, a peripheral portion a of the disc portion P₁ is turned up at right angle so that the surface of the turned up peripheral portion a contacts a flat surface of the bolt head 164b. Additionally, the turned up plate portion P₃ is located within a groove 220 which includes a first groove 220a formed on the radial annular portion 162a and a second groove 220b formed on the wall 202. By virtue of the thus arranged plate member 208", the bolt 164 is prevented from freely rotating and therefore sleeve shaft 162 is securely maintained at a desired position.

It will be also understood that the dimension indicated by l₃ considerably smaller than that l in the prior art shown in FIG. 1.

As appreciated from the foregoing discussion, according to the present invention, the dimension of the idler gear supporting arrangment is considerably decreased in the axial direction of the idler gear 158 to reduce the overall length of the inner construction of the transmission. This can provide a relatively small size transmission which is suitable for a transverse engine of the automotive vehicle having a front-drive system.

While the present invention has been shown and described with respect to the automatic transmission, it will be understood that the principle of the present invention is applicable to other types of transmissions, for example, a standard transmission which is not provided with a torque converter and a planetary gear system.

What is claimed is:

1. In a power transmission having a gear mechanism with an output shaft carrying an output gear, said output gear being connected to the input gear of a final drive unit by means of an idler gear rotatably supported between spaced opposed first and second walls of the transmission, the improvement comprising:
- a cylindrical recess on the interior surface of said first wall and an opening in said second wall disposed oppositely to said cylindrical recess;
- an integral projection on said first wall extending axially inwardly from the bottom of said recess towards said opening, said projection cooperating with said recess to define an annular space;
- a sleeve shaft supported by and extending between said first and second walls, said sleeve shaft having first and second end portions, said first end portion being received in said annular space and surrounding said projection, said second end portion being received in said opening;
- bearing means on said sleeve shaft for rotatably supporting said idler gear;
- and retainer means engageable with said projection for axially urging said sleeve shaft towards said first wall to thereby maintain said first end portion within said annular space.

2. A power transmission as claimed in claim 1, in which said retainer means comprises external threads on said integral projection in threaded engagement with internal threads at the first end portion of said sleeve shaft.

3. A power transmission as claimed in claim 2, in which said sleeve shaft is formed at the second end portion thereof with a radial annular portion, said bearing means being disposed between said first wall and said radial annular portion and being subjected to an axial preloading as said sleeve shaft is urged axially toward said first wall.

4. A power transmission as claimed in claim 3, further comprising means for preventing said sleeve shaft from freely rotating.

5. A power transmission as claimed in claim 4, in which said sleeve shaft is formed at the second end portion thereof with a recess.

6. A power transmission as claimed in claim 5, in which the preventing means includes a plate member having one end portion fixed in the recess of said sleeve shaft, and a bolt for securing another end portion said plate member to the outer surface of said second wall.

7. A power transmission as claimed in claim 1 wherein said bearing means comprises first and second roller bearings, the outer races of said bearings being in engagement with and being spaced axially apart by said idler gear, and the inner races of said bearings being in engagement respectively with said first wall and the second end portion of said sleeve shaft.

8. A power transmission as claimed in claim 1 wherein said retainer means comprises a bolt extending axially through the bore of said sleeve shaft, one end of said bolt being threadedly engaged with said projection and the other end of said bolt having an enlarged head acting on the second end portion of said sleeve shaft.

9. A power transmission as claimed in claim 8 further comprising additional retainer means connected to said second wall and engageable with the second end portion of said sleeve shaft for preventing rotation of said sleeve shaft.

10. A power transmission as claimed in claim 9, in which said sleeve shaft is further formed at the second end portion thereof with a recess for receiving therein the additional retainer means and the head of said bolt, the dimension of said recess perpendicular to the axis of said bolt being larger than that of the opening formed through said sleeve shaft, thereby forming a shelf portion at the bottom of the recess of said sleeve shaft.

11. A power transmission as claimed in claim 10, in which said additional retainer means includes a plate member placed on said shelf portion, said plate member being secured to the second wall and having an opening through which the bolt passes so that the head of said bolt contacts the plate member at a location opposite to the projection on said second wall.

12. An power transmission as claimed in claim 11, in which said projection is formed with a threaded opening arranged coaxially with said sleeve shaft, the threaded portion of said bolt being screwed into the threaded opening.

13. A power transmission as claimed in claim 12, in which said first wall is formed at its outer surface with a cylindrical recess communicating with said threaded opening.

14. A power transmission as claimed in claim 13, further comprising an annular cap whose outer periphery sealingly contacts the peripheral surface of the cylindrical recess of said first wall.

15. A power transmission as claimed in claim 14, in which the bore of said sleeve shaft is generally frusto-conical, with the smallest diameter being located adjacent to the second end portion of said sleeve shaft.

16. A power transmission as claimed in claim 15, further comprising means for preventing said sleeve shaft from freely rotating about its axis.

17. A power transmission as claimed in claim 16, in which the preventing means includes said plate member, means for securing said plate member within the recess of said sleeve shaft so that said plate member cooperates with said sleeve shaft, and a bolt for securing said plate member to the second wall.

18. A power transmission as claimed in claim 16, in which the preventing means includes said plate member, and means defining a combined groove which includes a first groove formed on the surface of a radial annular portion of said sleeve shaft, and a second groove formed on the surface of the second wall, a portion of said plate member lying within said combined groove.

19. A power transmission as claimed in claim 18, in which said plate member includes first and second superimposed disc portions in contact with each other and interconnected by said portion.

20. A power transmission as claimed in claim 19, in which said first disc portion underlies the bolt head and has its end bent at a right angle away from the second disc portion to contact a flat surface of the bolt head.

21. An automatic transmission including a torque converter housed in a converter housing, and a planetary gear system having planetary gear elements, a power input element drivably connected to a drive member of the torque converter, and a power output element having an output gear which is positioned between and coaxially arranged with the torque converter and the planetary gear element, the output gear being operatively connected to an input gear of a final drive unit, the improvement comprising:
- means defining first and second spaced opposed walls, said first wall being formed at its inner surface with a cylindrical recess and said second wall having an opening aligned axially with said cylindrical recess;
- a projection formed at the central portion of said cylindrical recess and integral with said first wall to define a generally annular space in said cylindrical recess, the axis of said central projection being common with that of said cylindrical recess and said opening;

a sleeve shaft having a first end portion which is disposed in said annular space and a second end portion received in said opening;

first and second tapered roller bearings mounted on and axially spaced along the length of said sleeve shaft;

an idler gear rotatably carried on said shaft by said bearings, said idler gear being interposed between and meshing with the output gear of the power output element of the planetary gear system and the input gear of the final drive unit; and retainer means engageable with said projection for axially urging said sleeve shaft towards said first wall to thereby maintain said first end portion within said annular space.

* * * * *